United States Patent
Maeda et al.

(10) Patent No.: US 7,733,630 B2
(45) Date of Patent: Jun. 8, 2010

(54) ELECTRIC DOUBLE-LAYER CAPACITOR

(75) Inventors: Toshiyuki Maeda, Tokyo (JP);
Masanori Goudo, Tokyo (JP);
Katsutoshi Sugi, Tokyo (JP); Hideshige Nakagawa, Chiba (JP); Satoshi Kubota, Chiba (JP)

(73) Assignees: Japan Radio Co., Ltd. (JP); Nisshinbo Industries, Inc. (JP)

( * ) Notice: Subject to any disclaimer, the term of this patent is extended or adjusted under 35 U.S.C. 154(b) by 291 days.

(21) Appl. No.: 11/909,576

(22) PCT Filed: Mar. 24, 2006

(86) PCT No.: PCT/JP2006/306019

§ 371 (c)(1),
(2), (4) Date: Sep. 24, 2007

(87) PCT Pub. No.: WO2006/101208

PCT Pub. Date: Sep. 28, 2006

(65) Prior Publication Data

US 2009/0052116 A1  Feb. 26, 2009

(30) Foreign Application Priority Data

Mar. 24, 2005 (JP) .............................. 2005-087191

(51) Int. Cl.
*H01G 9/00* (2006.01)
*H01G 9/10* (2006.01)
*H01G 4/228* (2006.01)
*H05K 5/03* (2006.01)

(52) U.S. Cl. .................. 361/502; 361/520; 361/538

(58) Field of Classification Search ................. 361/502, 361/520, 522, 538, 540, 541
See application file for complete search history.

(56) References Cited

U.S. PATENT DOCUMENTS 6,201,686 B1 * 3/2001 Hiratsuka et al. ........... 361/502

FOREIGN PATENT DOCUMENTS

| JP | 62-112175 | 7/1987 |
| JP | 05090084 A * | 4/1993 |
| JP | 06275476 A * | 9/1994 |
| JP | 2001-338850 | 12/2001 |
| JP | 2002-151365 | 5/2002 |
| JP | 2002-299191 | 10/2002 |

(Continued)

OTHER PUBLICATIONS

English translation of International Preliminary Report on Patentability for International Application No. PCT/JP2006/306019.

(Continued)

*Primary Examiner*—Eric Thomas
*Assistant Examiner*—David M Sinclair
(74) *Attorney, Agent, or Firm*—Cantor Colburn LLP

(57) ABSTRACT

A plurality of capacitor cells (10) are layered to form a cell group. On the top of each capacitor cell (10), a pair of electrode plates (10b) is formed to protrude upward. The adjacent electrode plates (10b) are connected to each other. A connection piece (20) protruding upward is attached to each of the electrode plates (10b). The connection piece (20) is connected to a circuit substrate (30). Thus, it is possible to effectively make a connection between the cell group of the capacitor cells (10) and the circuit substrate (30).

4 Claims, 9 Drawing Sheets

| | FOREIGN PATENT DOCUMENTS | | |
|---|---|---|---|
| JP | 2002298825 A | * | 10/2002 |
| JP | 2003-124081 | | 4/2003 |
| JP | 2003-217985 | | 7/2003 |
| JP | 2003-272966 | | 9/2003 |

OTHER PUBLICATIONS

International Search Report for International Application No. PCT/JP2006/306019 dated Jun. 20, 2006.

* cited by examiner

ELECTRIC DOUBLE-LAYER CAPACITOR

TECHNICAL FIELD

The present invention relates to an electric double layer capacitor comprising a group of cells formed by stacking a plurality of electric double layer capacitor cells.

BACKGROUND ART

An output voltage (electric strength) of a single electric double layer capacitor cell (hereinafter referred to as a capacitor cell) of an electric double layer capacitor, which is generally used as various power sources, may be as low as a few volts. Therefore, the capacitor cells are manufactured in units of a cell group which contains a plurality of stacked capacitor cells. In each capacitor cell, an electric double layer capacitor is formed in a bag made of aluminum laminate film, having one pair of electrode plates provided at the top thereof.

A plurality of capacitor cells are serially connected to thereby form a cell group, and produce a desired voltage. The electrode plates of the adjacent capacitor cells are connected to each other.

Japanese Patent Laid-open Publication No. 2003-272966 discloses that electrode plates of two adjacent capacitor cells are connected via a rivet and fixed by means of TIG welding. Japanese Patent Laid-open Publication No. 2002-151365 discloses that a plastically deformable connection plate is welded, at both ends thereof, to the electrode plates of two adjacent capacitor cells to thereby attain electrical connection.

As to charging and discharging of the cell group in an electric double layer capacitor, charging and discharging may be performed with respect to the electrodes of the electric double layer capacitor cells at both ends of the serially connected electric double layer capacitor cells, or the cell group. However, the state of charge and discharge may often vary among the respective capacitor cells. Therefore, there is a desire that the charge and discharge states among the respective capacitor cells be uniform. Thus, charge and discharge with respect to each capacitor cell is often controlled based on pre-measured voltages of the electrodes of the serially connected capacitor cells, such that the respective capacitor cells are charged in constant states.

When the voltage of the electrode plate of each capacitor cell is measured to control the charge and discharge amount, as described above, a circuit substrate having a circuit or the like mounted thereon for the control needs to be connected to the cell group.

With such a process, a structure is applicable in which the adjacent electrode plates are formed extending to the above of the circuit substrate and the extending portions are bent and directly fixed to the circuit substrate using screws. Another applicable structure is one in which a cable or the like connected to a respective electrode plate is connected to the circuit substrate.

However, the arrangement in which a long electrode plate of the capacitor cell is formed and directly fixed to a printed board using a screw has a problem that a resistance value of the entire element increases due to the length of the electrode plate, with the result that the resistance value is increased.

A connection method using a cable results in complicated operation, which takes time, and has a problem that the size of the element becomes larger because a space for holding the bundle of cables must be provided.

Still another problem is that the electrode and the cable tend to be easily damaged when the screws are fixed because of the vibration or impact due to the weight of the electrode and/or the screw on the substrate.

SUMMARY

According to the present invention, there is provided an electric double layer capacitor having a cell group containing a plurality of stacked electric double layer capacitor cells, and a circuit substrate electrically connected to each of the electric double layer capacitor cells contained in the cell group, wherein each of the electric double layer capacitor cells has electrode plates protruding from an end thereof and connected to respective electrodes in pair of the electric double layer capacitor cell, adjacent electrode plates are connected to each other, whereby the plurality of electric double layer capacitor cells are connected either in series or in parallel, a connection piece protrudes from a portion where the electrode plates of two adjacent electric double layer capacitor cells are connected, and the connection piece is connected to the circuit substrate.

Preferably, the connection piece may be a metallic wire or panel member.

Preferably, connection between two adjacent electrode plates of the electric double layer capacitor cells may be attained using ultrasonic welding.

Preferably, the connection piece may be bendable.

Preferably, the connection piece may be fixed to a surface of the electrode plate from outside thereof.

Preferably, the connection piece may be mounted to another panel member, and the panel member may be fixed to the surface of the electrode plate.

Preferably, the connection piece may be fixed to one end of the panel member, and another end of the panel member is fixed to the electrode plate, so that the panel member is movable, at that other end, relative to the electrode plate.

Preferably, the connection piece may be sandwiched by two electrode plates and thereby fixed.

As described above, according to the present invention, a connection piece is formed protruding from the electrode plate, and connection to the circuit substrate is attained utilizing the connection piece. This arrangement can improve the workability and reduce the size and weight of the devices.

BEST MODE FOR CARRYING OUT THE INVENTION

In the following, an embodiment of the present invention will be described based on the accompanying drawings.

Figure 1B:
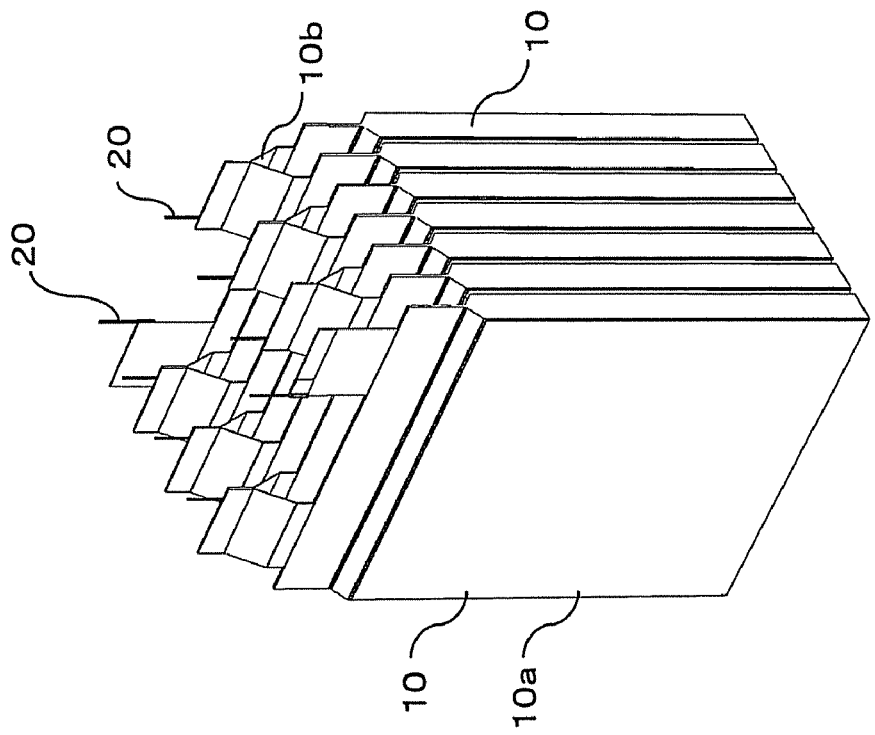
FIGS. 1A and 1B are a diagram showing a structure of an embodiment of the present invention.
Figure 1A:
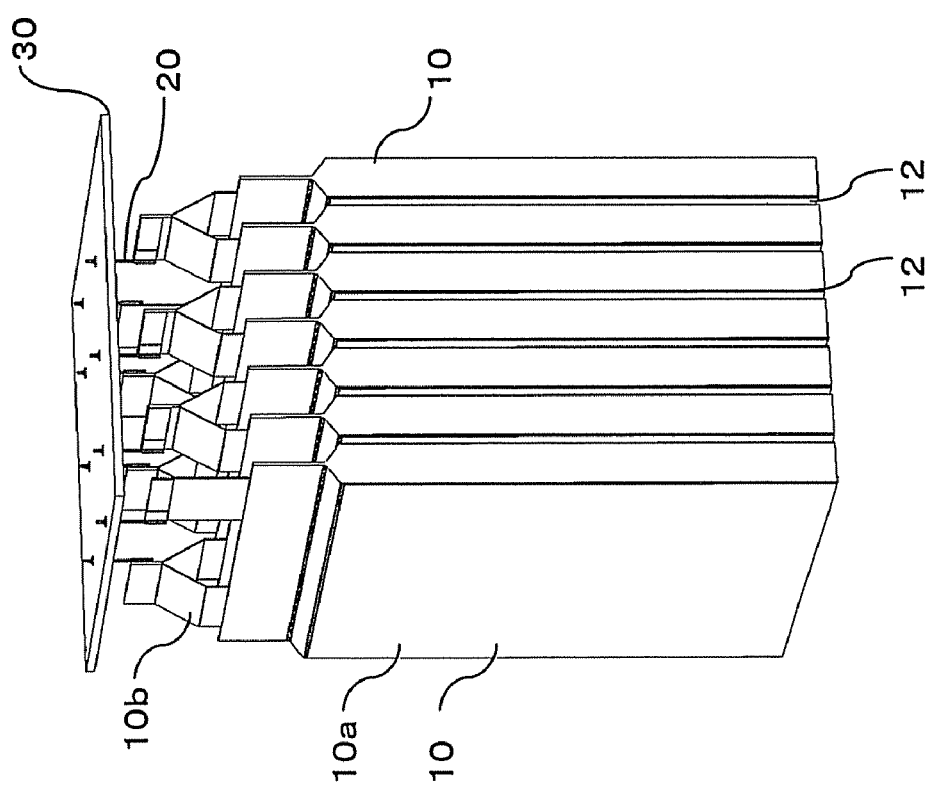

FIGS. 1A and 1B are a diagram showing a structure of an electric double layer capacitor according to one embodiment of the present invention. The capacitor cell 10 in the shape of a plate as a whole comprises a main body 10a in a thin rectangular parallelepiped and an upper portion closed in a mountain-like shape. A pair of aluminum or copper (or bronze) electrode plates 10b is formed protruding from the upper end of the plate-like main body 10a. The main body 10a is formed comprising multiple layered sheets, and accommodates, inside thereof, an electric double layer capacitor which comprises an activated carbon electrode, a separator, an electrolyte, and so forth.

One electrode plate 10b of the capacitor cell 10 is connected to one electrode plate 10b of the adjacent capacitor cell 10. Specifically, the two electrode plates 10b to be connected are bent so as to become closer to each other, and ultrasonically welded in the portion where the two electrode plates 10b are placed together. The electrode plates 10b may be connected by other means, such as laser welding, resistance welding, soldering, and so forth.

The other electrode plate 10b of the capacitor cell 10 is connected to the electrode plate 10b of the adjacent capacitor cell 10, on the other side. In this manner, a plurality of capacitor cells 10 are stacked and serially connected to one another, although it should be noted that the plurality of capacitor cells 10 may be connected in parallel when desired in consideration of their intended use. Although not shown, the electrode plates 10b of the capacitor cell 10 on both ends of the cell group, which are not connected to the electrode plates 10b of the adjacent capacitor cells 10, constitute the electrodes on both ends of the cell group.

A erectable metallic connection piece 20 is connected to the electrode plate 10b, protruding from the upper end of the electrode plate 10b. It should be noted that, although a bar-like connection piece 20 is used in this example, the connection piece 20 in any shape, such as a thin plate or the like, may be similarly used.

The connection piece 20 is fixed by means of soldering or the like to the circuit substrate 30 placed above the cell group of the capacitor cells 10, piercing through a hole defined on the circuit substrate 30 from below to above the circuit substrate 30. That is, the connection piece 20, which is readily deformable, penetrates, as positioned matched with, the hole on the circuit substrate 30, and soldered to a copper pattern on the upper surface of the circuit substrate. Preferably, the tip end of the connection piece 20 may be bent and soldered to the pattern on the circuit substrate 30.

Preferably, a rubber sheet 12 may be inserted between the capacitor cells 10 when multiple capacitor cells 10 are stacked. Preferably, the rubber sheet 12 may be made of silicon, EPDM, EPM (ethylene-propylene rubber), NBR (nitrile rubber), CR (chloroprene rubber) or the like, and have a thickness of 0.2 to 1 mm providing a large friction resistance.

Figure 2:
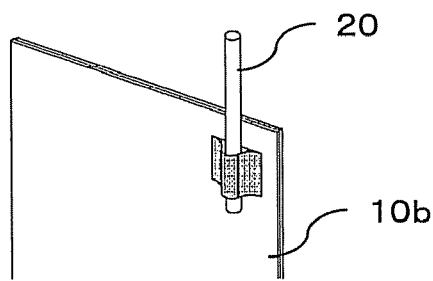
FIG. 2 is a diagram showing one example of a state of mounting a connection piece.
Figure 3:
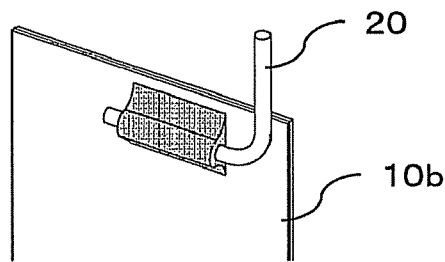
FIG. 3 is a diagram showing one example of a state of mounting a connection piece.

FIGS. 2 to 18 show various examples of the mounting of the connection piece 20. In FIG. 2, the lower portion of the connection piece 20 is soldered to the upper end portion of the electrode plate 10b, with the upper portion of the connection piece 20 protruding from the upper end of the electrode plate 10b. In FIG. 3, the connection piece 20 is bent into an L shape, with one side of the L shape soldered to the upper portion of the electrode plate 10b so as to be parallel to the upper end of the electrode plate 10b. Consequently, the other side of the connection piece 20 protrudes from the upper end of the electrode plate 10b. It should be noted that, in connecting two electrode plates 10b, preferably, the electrode plates 10b may be welded to each other in advance. Although ultrasonic welding is preferably used for the welding, laser welding, resistance welding, and so forth are also applicable.

Figure 4:
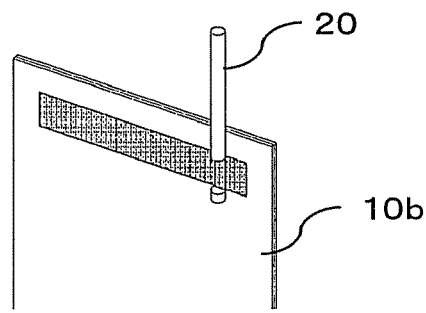
FIG. 4 is a diagram showing one example of a state of mounting a connection piece.
Figure 5:
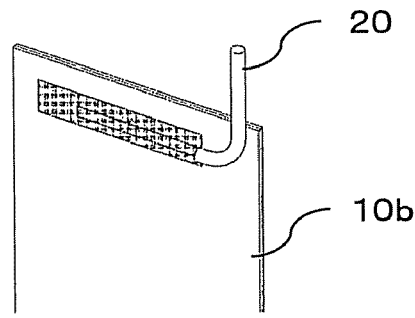
FIG. 5 is a diagram showing one example of a state of mounting a connection piece.

In FIG. 4, the lower portion of the connection piece 20 is welded in the upper end portion of the electrode plate 10b, with the upper portion of the connection piece 20 protruding from the upper end of the electrode plate 10b. Although ultrasonic welding is preferably used for the welding, laser welding, resistance welding, and so forth are also applicable. Further, in this example, soldering to attach the two electrode plates 10b in the portion where two electrode plates 10b are placed together can be simultaneously carried out. In FIG. 5, the connection piece 20 is bent into an L shape, with one side of the L-shape welded in the upper portion of the electrode plate 10b so as to be parallel to the upper end of the electrode plate 10b.

Figure 6:
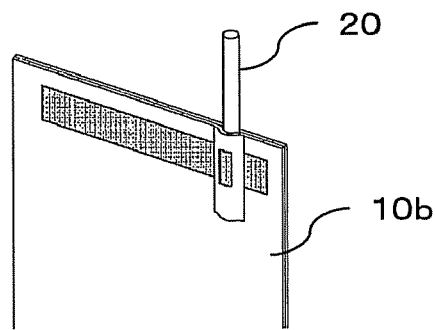
FIG. 6 is a diagram showing one example of a state of mounting a connection piece.
Figure 7:
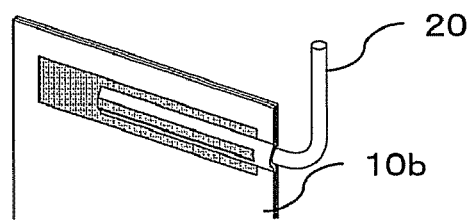
FIG. 7 is a diagram showing one example of a state of mounting a connection piece.

In FIG. 6, the lower portion of the connection piece 20 is inserted between two electrode plates 10b. The two electrode plates 10b, containing the portion into which the connection piece 20 is inserted, are welded, whereby the connection piece 20 is fixed to the electrode plate 10b. In FIG. 7, the connection piece 20 is bent into an L shape, with one side of the L-shape inserted between two electrode plates 10b from the lateral side thereof so as to be parallel to the upper end of the electrode plate 10b, and the two electrode plates 10b and the connection piece 20 are welded.

Figure 8:
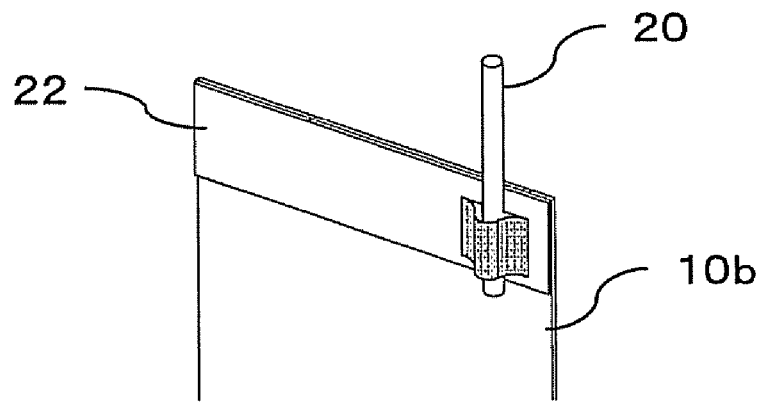
FIG. 8 is a diagram showing one example of a state of mounting a connection piece.
Figure 9:
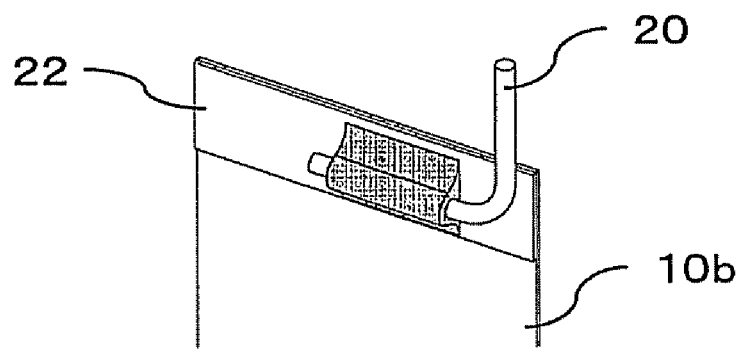
FIG. 9 is a diagram showing one example of a state of mounting a connection piece.

In FIG. 8, the lower portion of the connection piece 20 is soldered to the connection copper plate or panel member 22, and the connection copper plate 22 is welded to the electrode plate 10b. The connection plate is preferably a plate which can be soldered to the connection piece 20. Although ultrasonic welding is preferable for the welding, laser welding, resistance welding, and so forth may also be applicable. Further, in this example, soldering to attach the two electrode plates 10b in the portion where the two electrode plates 10b are placed together can be simultaneously carried out. It should be noted that the connection copper plate 22 is generally made of copper or bronze. In FIG. 9, the connection piece 20 is bent into an L shape, with one side of the L-shape soldered to the connection copper plate 22.

Figure 10:
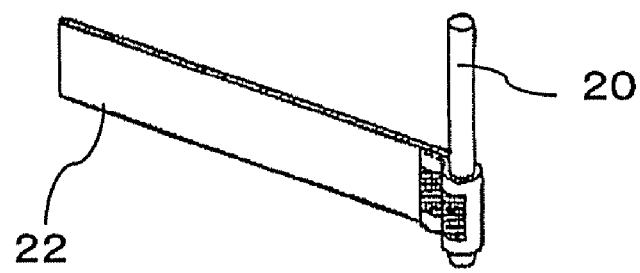
FIG. 10 is a diagram showing one example of a state of mounting a connection piece.
Figure 11:
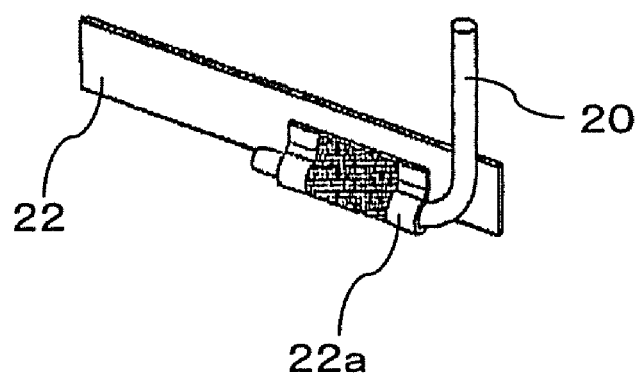
FIG. 11 is a diagram showing one example of a state of mounting a connection piece.
Figure 12:
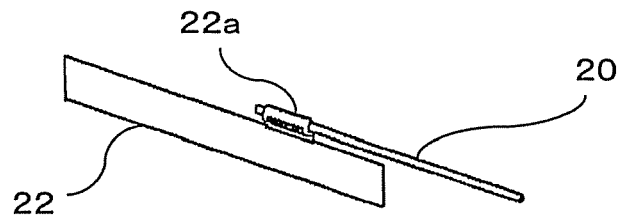
FIG. 12 is a diagram showing one example of a state of mounting a connection piece.

FIGS. 10, 11, and 12 show examples of mounting of the connection piece 20 to the connection copper plate 22. That is, when the connection piece 20 cannot be welded to electrode plate 10b, the connection piece 20 is welded in advance to a material (the connection copper plate 22) which can be welded to the electrode plate 10b, and the material is welded to the electrode plate 10b.

In FIG. 10, the end of the connection copper plate 22 is rounded so as to wind around the connection piece 20, and the rounded portion is welded to thereby fix the connection piece 20 to the connection copper plate 22. In FIG. 11, one side of the L-shaped connection piece 20 is placed on the connection copper plate 22, and covered by the extended portion 22a of the connection copper plate 22, and the connection piece 20 and the extended portion 22a are welded thereby fix the connection piece 20 to the connection copper plate 22. In FIG. 12, the copper connection piece 22 has a portion, or a connection portion 22a, formed by extending upward a part thereof on the longer side thereof, and an end of the connection piece 20 is placed on the connection portion 22a so as to be substantially parallel to the longer side of the connection copper plate 22 and wound by the connection portion 22a. Then, the connection portion 22a is welded to thereby fix the connection piece 20 to the connection copper plate 22. Although ultrasonic welding is preferable for the fixing in FIGS. 10 to 12, laser welding, resistance welding, soldering, or caulking may also be applicable.

Figure 13:
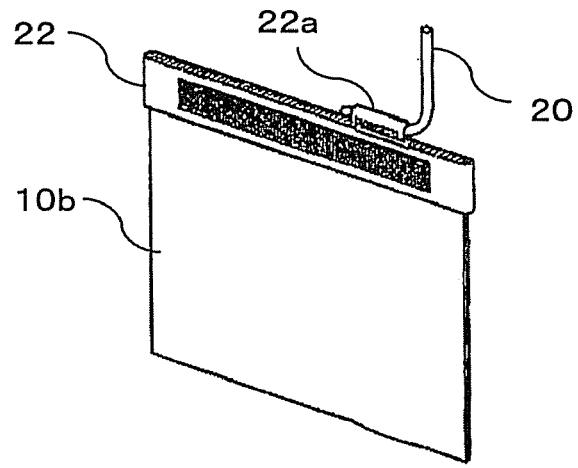
FIG. 13 is a diagram showing one example of a state of mounting a connection piece.
Figure 14:
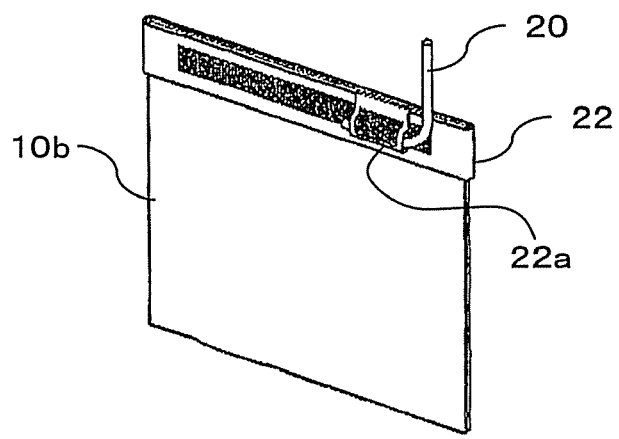
FIG. 14 is a diagram showing one example of a state of mounting a connection piece.

FIGS. 13 and 14 show an example in which the connection copper plate 22 in FIG. 12 is fixed to the electrode plate 10b. In FIG. 13, the longitudinal portion of the connection copper plate 22 is welded to the electrode plate 10b, and the end of the connection piece 20, other than the end fixed to the connection plate 22, is bent upward so that the entire shape of the connection piece 20 results in an L shape. In the above, the connection piece 20 may be bent into an L shape before being welded. Although ultrasonic welding is preferable for the welding, laser welding or resistance welding may be applicable. Further in this example, soldering to attach the two electrode plates 10b in the portion where the two electrode plates 10b are placed together can be simultaneously carried out. Also, the connection copper plate 22 may be soldered to the electrode plate 10b. During the welding or soldering process, winding both ends of the connection plate 22 from the lateral sides of the electrode plate 10b and fixing the parts to be welded or soldered makes it easier to attain positioning and improves operability. FIG. 14 shows one example in which the connection portion 22a, where one end of the connection piece 20 is fixed to the connection copper plate 22, is bent so as to be placed over the connection copper plate 22. In FIGS. 13 and 14, the connection piece 20 is mainly movable. As the connection copper plate 22 can be fixed across the entire width of the electrode plate 10b, with a wider range ensured for fixture, the contact resistance value can be reduced and the reliability of the cell can be increased.

Figure 15:
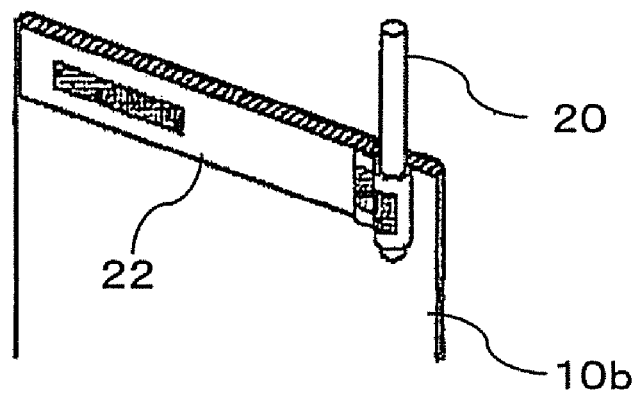
FIG. 15 is a diagram showing one example of a state of mounting a connection piece.
Figure 16:
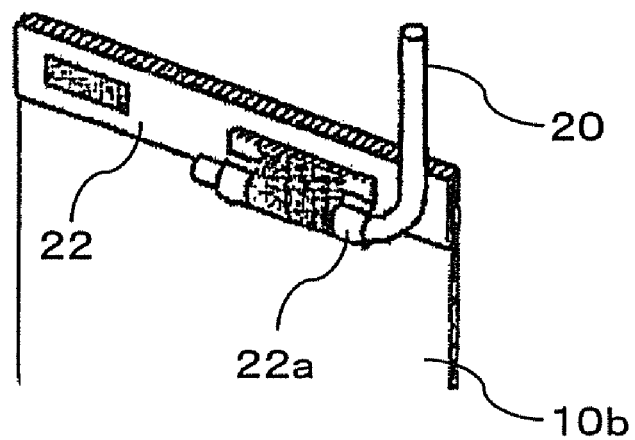
FIG. 16 is a diagram showing one example of a state of mounting a connection piece.
Figure 17:
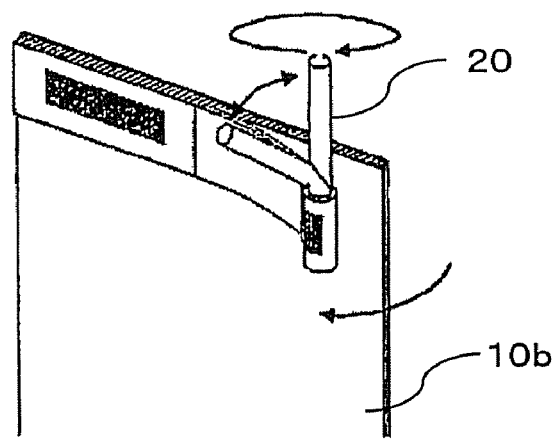
FIG. 17 is a diagram showing movement of the connection piece in FIG. 15.
Figure 18:
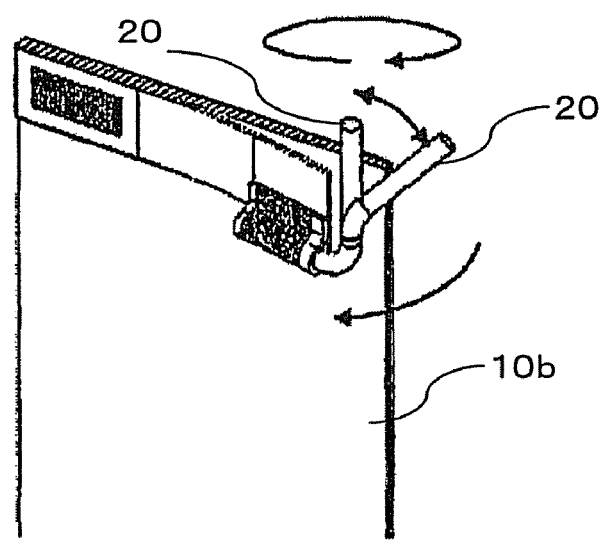
FIG. 18 is a diagram showing movement of the connection piece in FIG. 16.

FIGS. 15 and 16 show examples in which the connection copper plates 22 in FIGS. 10 and 11 are fixed to the electrode plate 10b. In these examples, the connection copper plate 22 is long narrow, and the connection piece 20 is fixed on one end thereof. The connection copper plate 22 is fixed, only on the side free from the connection piece 20, by means of welding to the electrode plate 10b. Although ultrasonic welding is preferable for the welding, laser welding, resistance welding, or the like may be also applicable. Further, in this example, soldering to attach the two electrode plates 10b in the portion where the two electrode plates 10b are placed together can be simultaneously carried out. The connection copperplate 22 may be fixed, by means of soldering, to the electrode plate 10b. Therefore, the end of the connection copper plate 22, where the connection piece 20 is mounted, is left as a free, and therefore movable, end.

As described above, when the connection piece 20 or both of the connection copper plate 22 and the connection piece 20 is/are left movable, positioning of the upper end of the connection piece 20 can be readily attained. This facilitates fixing of the upper end of the connection piece 20 to the circuit substrate 30. That is, as the connection piece 20 is mainly movable in FIGS. 2 to 9, 13, and 14, and not only the connection piece 20, but also the connection copper plate 22 are left movable in FIGS. 17 and 18, the position of the upper end of the connection piece 20 can be readily adjusted.

Figure 19:
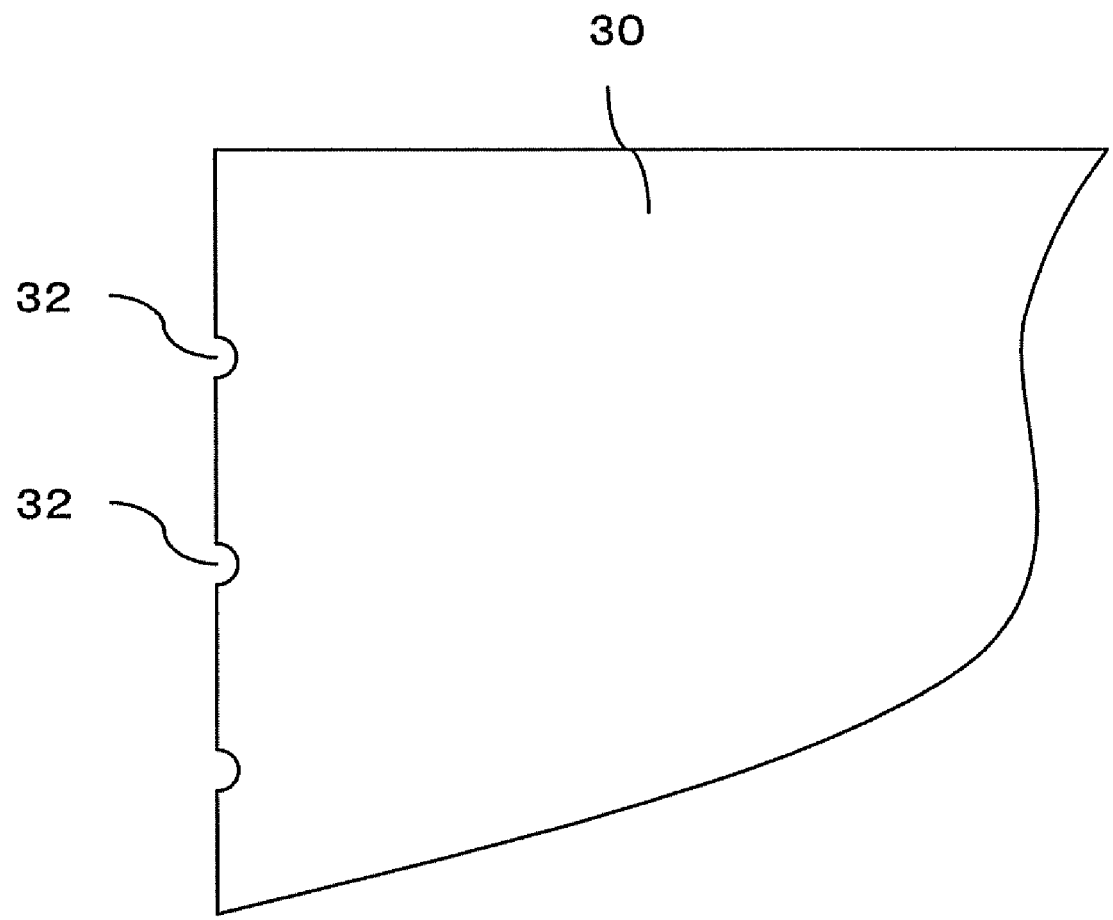
FIG. 19 is a diagram showing a shape of a circuit substrate.

FIG. 19 shows another example of the circuit substrate 30. In this example, an arc notch 32 is formed on the lateral side of the circuit substrate 30, rather than forming a hole on the circuit substrate 30. Thus, the upper end of the connection piece 20 is placed passing through the notch 32 and bent, while standing upright, towards the inner side, whereby the connection piece 20 can be readily soldered to the conductive pad on the circuit substrate 30. The work is easier in this example than in the example which employs a method using a circuit substrate 30 having a hole formed thereon for passing through the connection piece 20.

It should be noted that connecting the electrode plates 10b to each other by means of welding as described in the above embodiment enables reduces the resistance value between the capacitor cells and also the resistance of the element. In addition, as the connection piece 20 and the connection copper plate 22 are flexible, a preferable operability is achieved.

The invention claimed is:

1. An electric double layer capacitor having a cell group containing a plurality of stacked electric double layer capacitor cells, and a circuit substrate electrically connected to each of the electric double layer capacitor cells contained in the cell group, comprising:
   electrode plates protruding from an end of each electric double layer capacitor cell and connected to electrodes of the electric double layer capacitor cell;
   a panel member fixed to the electrode plate; and
   a linear connection piece having a first end fixed to the panel member and a second end protruding away from the electrode plate; wherein
   the first end side of the linear connection piece is wound around by and fixed to a plate-shaped connection member while the connection member is fixed to the panel member, and the second end side of the linear connection piece is connected to the circuit substrate; and
   the connection piece and the connection member are fixed to a first end side of the panel member, and a second end side of the panel member is fixed to the electrode plate, such that the first end side of the panel member to which the connection piece and the connection member are fixed is movable with respect to the electrode plate.

2. An electric double layer capacitor having a cell group containing a plurality of stacked electric double layer capacitor cells, and a circuit substrate electrically connected to each of the electric double layer capacitor cells contained in the cell group, comprising:
   electrode plates protruding from an end of each electric double layer capacitor cell and connected to electrodes of the electric double layer capacitor cell;
   a panel member fixed to the electrode plate; and
   a linear connection piece having a first end fixed to the panel member and a second end protruding away from the electrode plate; wherein
   the first end side of the linear connection piece is wound around by and fixed to a plate-shaped connection member while the connection member is fixed to the panel member;
   the linear connection piece is bent into an L shape and connected to the circuit substrate;
   the panel member is formed across the entire width of the electrode plate; and the connection member has a width narrower than that of the panel member, and is fixed to a part of the panel member.

3. The electric double layer capacitor according to claim 2, wherein the connection member is fixed overlapping the panel member while being wound around one end of the linear connection piece.

4. An electric double layer capacitor having a cell group containing a plurality of stacked electric double layer capacitor cells, and a circuit substrate electrically connected to each of the electric double layer capacitor cells contained in the cell group, comprising:

electrode plates protruding from an end of each electric double layer capacitor cell and connected to electrodes of the electric double layer capacitor cell;

a panel member fixed to the electrode plate; and a linear connection piece having a first end fixed to the panel member and a second end protruding away from the electrode plate; wherein the first end side of the linear connection piece is wound around by and fixed to a plate-shaped connection member while the connection member is fixed to the panel member;

the linear connection piece is bent into an L shape and connected to the circuit substrate; and the connection member is fixed overlapping the panel member while being wound around one end of the linear connection piece.

* * * * *